(12) United States Patent
Kim et al.

(10) Patent No.: US 9,702,319 B2
(45) Date of Patent: Jul. 11, 2017

(54) FLOWMETER SYSTEM

(71) Applicant: Soongsil University Research Consortium Techno-Park, Seoul (KR)

(72) Inventors: Jin Oh Kim, Seoul (KR); Ju Wan Kim, Bucheon-si (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 220 days.

(21) Appl. No.: 14/809,583

(22) Filed: Jul. 27, 2015

(65) Prior Publication Data
US 2016/0025538 A1    Jan. 28, 2016

(30) Foreign Application Priority Data
Jul. 28, 2014  (KR) .................. 10-2014-0095740

(51) Int. Cl.
| | | |
|---|---|---|
| G01F 1/684 | (2006.01) | |
| F02G 1/043 | (2006.01) | |
| F03G 7/00 | (2006.01) | |
| G01D 1/00 | (2006.01) | |
| G01F 15/00 | (2006.01) | |

(52) U.S. Cl.
CPC .............. *F02G 1/043* (2013.01); *F03G 7/00* (2013.01); *G01D 1/00* (2013.01); *G01F 15/00* (2013.01); *F02G 2280/00* (2013.01); *F02G 2280/20* (2013.01)

(58) Field of Classification Search
CPC .. F02G 1/043; F02G 2280/00; F02G 2280/20; F03G 7/00; G01D 1/00; G01F 15/00

USPC ...................................................... 73/114.34
See application file for complete search history.

(56) References Cited

U.S. PATENT DOCUMENTS

| | | | | |
|---|---|---|---|---|
| 7,181,912 B2* | 2/2007 | Mori | .................. | B60K 8/00 60/517 |
| 8,096,118 B2* | 1/2012 | Williams | ................ | F02G 1/043 60/519 |

FOREIGN PATENT DOCUMENTS

| | | |
|---|---|---|
| JP | 2002-270908 A | 9/2002 |
| KR | 10-2007-0022294 A | 2/2007 |
| KR | 10-1133043 A | 4/2012 |

OTHER PUBLICATIONS

Mastbergen, et al., "Generating Light from Stoves Using a Thermoelectric Generator", ETHOS, 2005.

* cited by examiner

*Primary Examiner* — Freddie Kirkland, III
(74) *Attorney, Agent, or Firm* — Pearne & Gordon LLP

(57) ABSTRACT

In one example embodiment, there is provided a flowmeter system. The flowmeter system includes a high temperature transferring part that collects external heat energy to transfer the heat energy; a low temperature transferring part that transfers heat energy of an intake pipe; a stirling engine that produces a power based on a temperature difference between the heat energy transferred from the high temperature transferring part and the heat energy transferred from the low temperature transferring part; and a flowmeter that is supplied with the power produced by the stirling engine to measure a flow rate of the intake pipe.

5 Claims, 4 Drawing Sheets

FLOWMETER SYSTEM

CROSS-REFERENCE TO RELATED APPLICATION

This application claims the benefit of Korea Patent Application No. 10-2014-0095740 filed on Jul. 28 2014, the disclosures of which are incorporated herein by reference.

TECHNICAL FIELD

The embodiments described herein pertain generally to a flowmeter system.

BACKGROUND

In general, a flow instrument (including a flowmeter, an electrical sensor, a hydrometer, a hydraulic meter, etc.; hereinafter, referred to as a "flowmeter"), which is installed in a pipe or the like to measure flow of fluid, is a device used in houses, buildings and others to exactly measure a volume of fluid used, and such a flowmeter is mounted at a certain position in a pipe, i.e., a water and wastewater pipe, to indicate a volume of fluid (water) flowing in the pipe with numbers.

Such a flowmeter includes a calculation means that calculates a signal detected from measuring a flow rate of fluid flowing in a pipe, and a display means that visually displays the flow rate calculated in the calculation means.

Pipes are connected to both opened ends of the flowmeter, and a rotor rotating by fluid is installed in a passageway of the inside of the flowmeter, wherein an end of the rotor is formed with a magnetizable magnetic inductor, and thus, the calculation means outputs a signal detected from sensing the magnetic inductor of the rotor rotating by fluid, so as to indicate a volume of the fluid with numbers.

This electronic flowmeter is equipped with a battery for supply of a power and normally operates by the power. Further, there is a disadvantage in that since the battery equipped in the flowmeter is consumable, electric energy stored in the battery is fully exhausted as certain time lapses.

Moreover, the conventional flowmeter has a problem in that even if the battery has run out, and thus, operated abnormally, no one may know the abnormal operation of the flowmeter until he/she personally checks the flowmeter, and is inconvenient in that the battery should be replaced with new one every time it is exhausted.

Meanwhile, in this regard, Korean Utility Model Publication No. 20-0300991 (entitled: "Flowmeter") describes a flowmeter, which measures a flow rate when fluid flows.

SUMMARY

In order to solve the foregoing conventional problems, example embodiments provide a flowmeter system supplying a power to a flowmeter installed in an intake pipe, to which a power is not easily supplied, by using a low temperature difference stirling engine.

In one example embodiment, there is provided a flowmeter system. The flowmeter system includes a high temperature transferring part that collects external heat energy to transfer the heat energy; a low temperature transferring part that transfers heat energy of an intake pipe; a stirling engine that produces a power based on a temperature difference between the heat energy transferred from the high temperature transferring part and the heat energy transferred from the low temperature transferring part; and a flowmeter that is supplied with the power produced by the stirling engine to measure a flow rate of the intake pipe.

In accordance with the technical means of the example embodiments, the low temperature difference stirling engine is driven by using a difference in a temperature between the outside and the intake pipe, and a power produced by the driving of the engine is supplied to the flowmeter, so as to stably supply a power to the flowmeter installed in the intake pipe, to which a power is not easily supplied.

DETAILED DESCRIPTION

Figure 1:
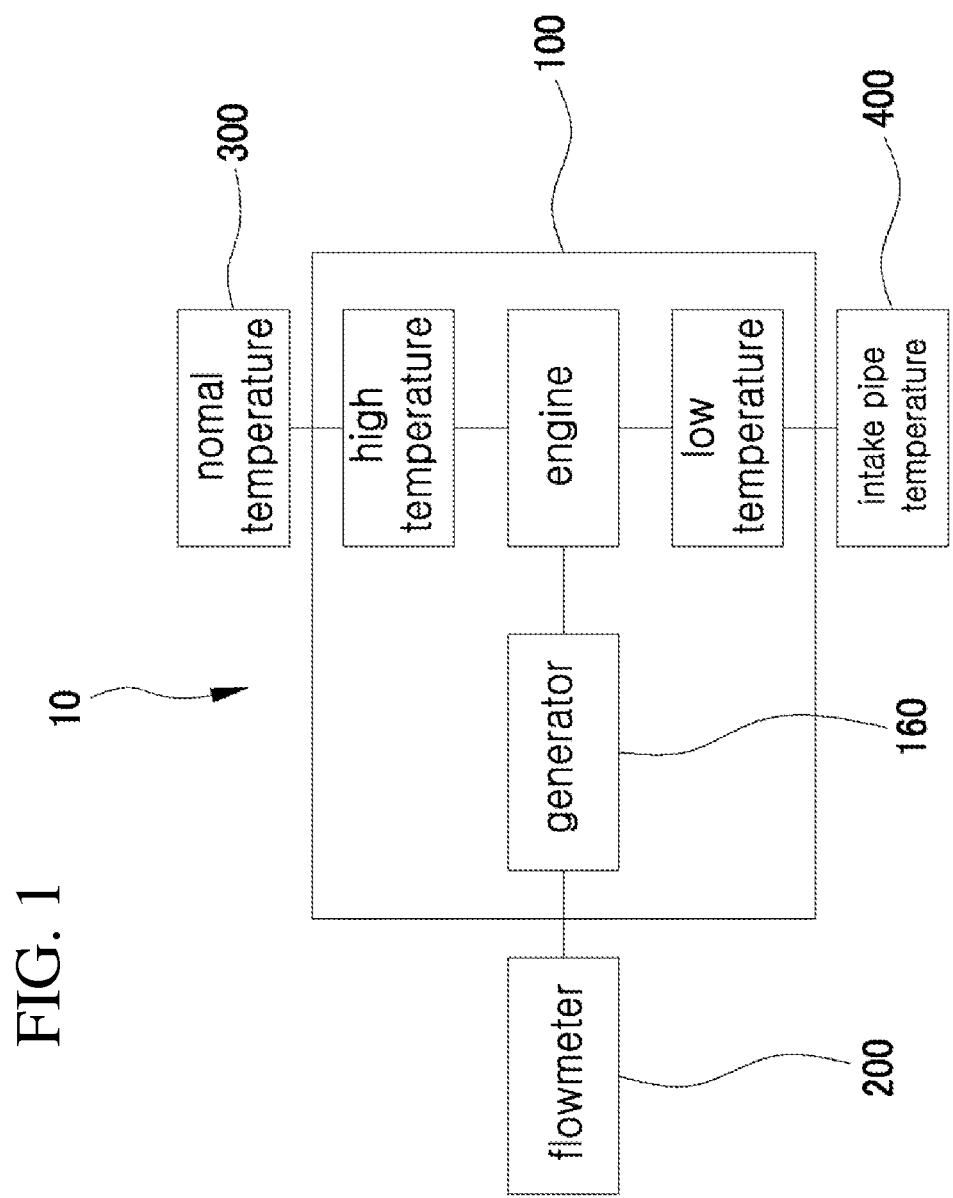
FIG. 1 is a conceptual diagram of a flowmeter system in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Throughout the whole document, the term "on" that is used to designate a position of one element with respect to another element includes both a case that the one element is adjacent to the another element and a case that any other element exists between these two elements.

Throughout the whole document, the term "comprises or includes" and/or "comprising or including" used in the document means that one or more other components, steps, operations, and/or the existence or addition of elements are not excluded in addition to the described components, steps, operations and/or elements. Throughout the whole document, the terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party.

Example embodiments relate to a flowmeter system 10.

First, a flowmeter system 10 (hereinafter, referred to the "present flowmeter system 10") in accordance with an example embodiment is described.

The present flowmeter system 10 includes a stirling engine 100 that produces a power by using a temperature difference, and supplies the power produced from the stirling engine 100 to a flowmeter 200 that measures a flow rate in an intake pipe 11.

More specifically, referring to FIG. 1, the present flowmeter system 10 converts heat energy into kinetic energy by using the stirling engine 100 that receives high-temperature heat energy from the outside and low-temperature heat energy from the intake pipe 11, produces a power by using the kinetic energy through a generator 160, and supplies the produced power to the flowmeter 200 measuring a flow rate in the intake pipe 11.

That is, the present flowmeter system 10 may semi-permanently supply a power to the flowmeter 200 through self-generation, by using a temperature difference between external heat energy and the intake pipe 11.

The above-described intake pipe 11 is a water and wastewater pipe and may be embedded under the ground; however, the intake pipe 11 is not limited thereto and may be a pipe, in which fluid flows. In addition, the present flowmeter system 10 may be a flowmeter system 10 that supplies a power to the flowmeter 200 measuring a volume of fluid flowing in a pipe.

Figure 2:
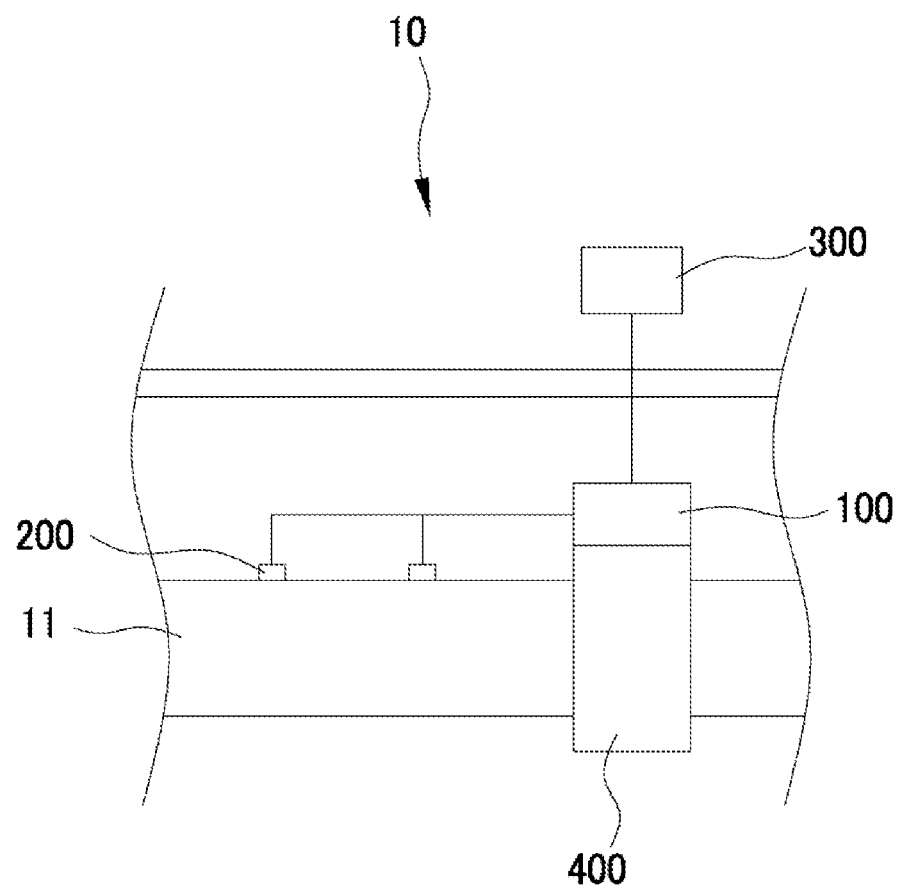
FIG. 2 is a schematic view of the flowmeter system in accordance with an example embodiment.

To this end, referring to FIG. 2, the present flowmeter system 10 includes a high temperature transferring part 300 that collects and transfers external heat energy, a low temperature transferring part 400 that transfers the heat energy of the intake pipe 11, a stirling engine 400 that produces a power based on a temperature difference between the heat energy transferred from the high temperature transferring part 300 and the heat energy transferred from the low temperature transferring part 400, and a flowmeter 200 that is supplied with the power produced from the stirling engine 100 to measure a flow rate of the intake pipe 11.

For example, the high temperature transferring part 300 may collect the heat energy from the sun or the earth surface heated by the sun to transfer the collected heat energy to the stirling engine 100. In this case, the high temperature transferring part 300 is preferably made of a material with high heat conductivity in order to effectively transfer the heat energy, and an insulating material may be placed on an outer peripheral surface of the high temperature transferring part 300 in order to suppress outward loss of the heat energy during the transfer of the heat energy.

In addition, the low temperature transferring part 400 is positioned closed to an outer peripheral surface of the intake pipe 11 to transfer the low-temperature heat energy collected by the intake pipe 11 to the stirling engine 100. In this case, the low temperature transferring part 400 is preferably made of a material with high heat conductivity in order to effectively transfer the heat energy.

Figure 3:
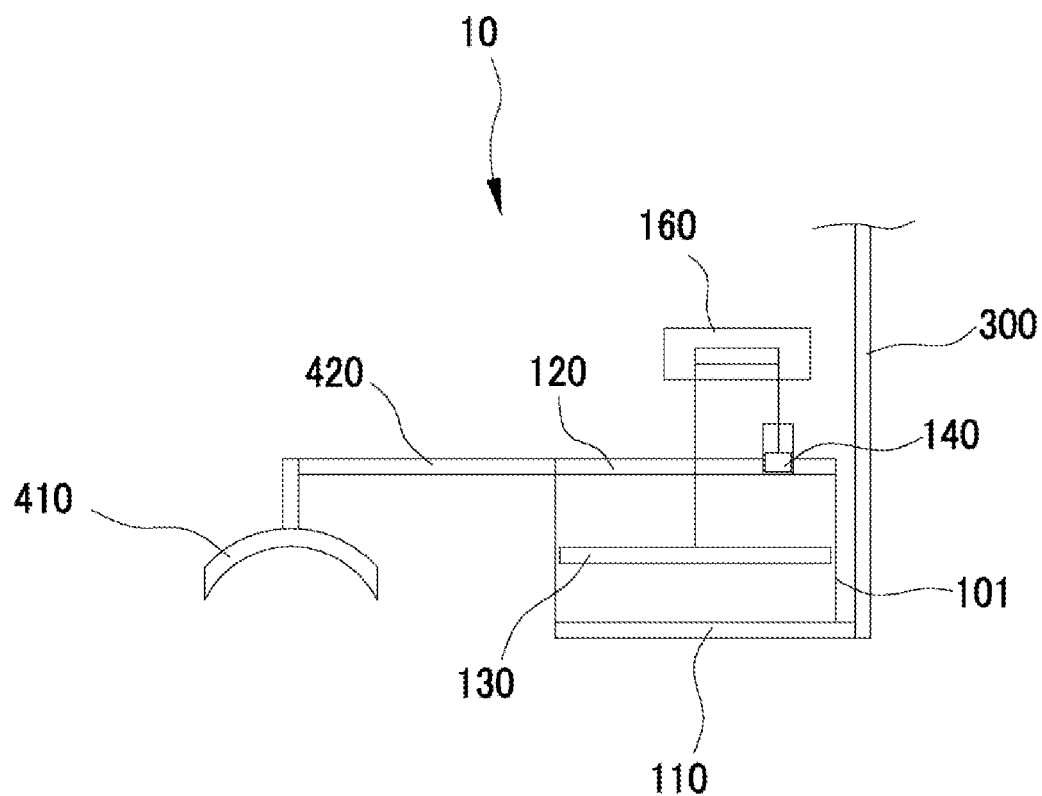
FIG. 3 is a schematic view of the flowmeter system in accordance with an example embodiment.

Referring to FIG. 3, the low temperature transferring part 400 may include an intake pipe temperature acquiring part 410 that is positioned closed to the outer peripheral surface of the intake pipe 11, and an intake pipe temperature transferring part 420 that transfers the heat energy of the intake pipe temperature acquiring part 410.

In addition, the intake pipe temperature acquiring part 410 may be of a shape wrapping the outer peripheral surface of the intake pipe 11 in part or as a whole.

The intake pipe temperature acquiring part 410 may be manufactured to have a shape wrapping the outer peripheral surface of the intake pipe 11 in part or as a whole, to collect low-temperature heat energy from the outer peripheral surface of the intake pipe 11.

The intake pipe temperature transferring part 420 may transfer the low-temperature heat energy collected in the intake pipe temperature acquiring part 410 to the stirling engine 100.

In this case, as described above, the intake pipe temperature acquiring part 410 and the intake pipe temperature transferring part 420 are preferably made of a material with high heat conductivity, and insulating materials may be placed on the outer peripheral surfaces of the intake pipe temperature acquiring part 410 and the intake pipe temperature transferring part 420 in order to suppress outward loss of heat energy during the transfer of the heat energy.

The stirling engine 100 may receive the heat energy transferred from the high temperature transferring part 300 and the low temperature transferring part 400, to produce a power by using a temperature difference of the heat energy.

The present flowmeter system 10 is advantageous in that it can stably generate a power over long time, by using the temperature of the intake pipe 11, which is relatively constant compared to an external temperature.

For example, the stirling engine 100 may be a gamma ($\gamma$) type stirling engine that enables generation in a low temperature difference.

The flowmeter 200 may be supplied with the power produced from the stirling engine to measure a flow rate of the intake pipe 1.

For example, the flowmeter 200 may be one of a differential pressure flowmeter, a laminar flowmeter, an area type flowmeter, a positive displacement flowmeter, a turbine flowmeter, an electronic flowmeter, an ultrasonic flowmeter, and a thermal flowmeter.

Figure 4:
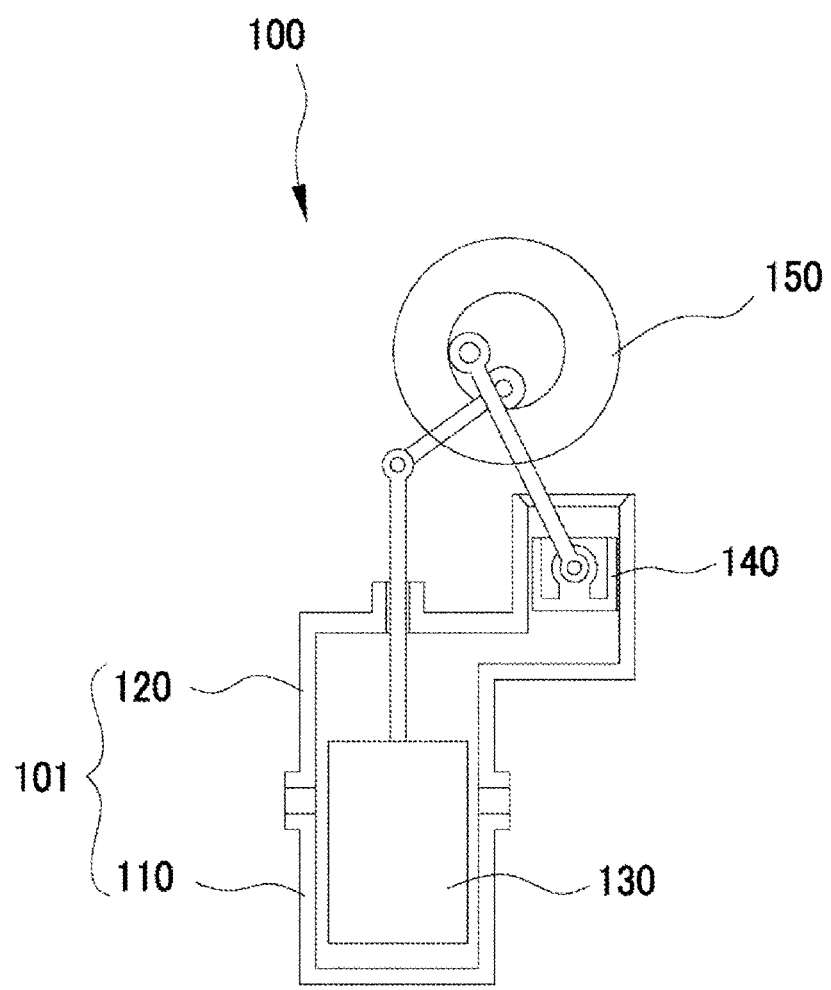
FIG. 4 is a schematic view of a stirling engine in accordance with an example embodiment.

The stirling engine 100 in accordance with an example embodiment is described, referring to FIG. 3 and FIG. 4.

Referring to FIG. 3, the stirling engine 100 may include a high temperature acquiring part 110 that heats an operation fluid by using heat energy transferred from a high temperature transferring part 300, a low temperature acquiring part 120 that cools the operation fluid by using heat energy transferred from a low temperature transfer part 400, a cylinder 101, in which the high temperature acquiring part 110 is placed at a lower portion thereof, and the low temperature acquiring part 120 is placed at an upper portion thereof, a displacer 130 that moves upwardly and downwardly within the cylinder 101 based on the heat energy of the high temperature acquiring part 110 and the heat energy of the low temperature acquiring part 120, a piston 140 that moves upwardly and downwardly by the upward and downward movement of the displacer 130, and a generator 160 that produces electric energy through the upward and downward movement of the piston 140.

Since the temperature of the intake pipe 11 is relatively constant, compared to an external temperature, the temperature difference from the external temperature continuously occurs. In this case, the stirling engine 100 may heat or cool fluid placed in the inside of the stirling engine 100 by using the occurring temperature difference so as to enable the upward and downward movement of the piston 140, and thereby, generating a power.

For example, as illustrated in FIG. 4, the cylinder 101 may be manufactured in a cylindrical shape, wherein the high temperature acquiring part 110 that receives high-temperature heat energy may be placed at a lower portion of the cylinder, and the low temperature acquiring part 120 that receives low-temperature heat energy may be placed at an upper portion of the cylinder.

In this case, the high temperature acquiring part 110 and the low temperature acquiring part 120 are preferably manufactured to be partially spaced from each other in a certain distance so as to avoid mutual heat transfer, or an insulating material is preferably placed between the high temperature acquiring part 110 and the low temperature acquiring part 120.

In addition, an insulating material (not illustrated) may be placed on a top portion of the low temperature transferring part 400 so as to suppress external heat energy from being transferred to the low temperature transferring part 400.

Hereinafter, an operation of the stirling engine 100 in accordance with an example embodiment is described.

First, the high temperature transferring part 300 acquires external heat energy, and insulates and transfers the external heat energy to the high temperature acquiring part 110 to heat the fluid placed in the inside of the cylinder 101, so that the displacer 130 can move upwardly.

Part of the heat fluid is cooled by the low temperature acquiring unit 120, and the cooled fluid is supplied to the high temperature acquiring part 110 through the space between the displacer 130 and the cylinder or a separate pipe, so that the high temperature fluid can be cooled and shrunk.

The fluid in the inside of the cylinder 101 repeatedly undergoes the shrinking and swelling processes, and as a result, the displacer 130 may repeatedly move in the upward and downward direction.

As the displacer 130 repeatedly moves in the upward and downward direction, a flywheel 150 coupled with the displacer 130 rotates, and the piston 140 coupled with the flywheel 150 may repeatedly move in the upward and downward direction.

In this case, in the generator 160, a magnet moves in the inside of an external coil due to the vertical displacement occurring in the piston 140, and accordingly, induced currents flow, so that a power can be generated.

The flowmeter 200 may be stably supplied with the power generated by the generator 160, to measure the flow rate in the intake pipe 11.

In the above descriptions, the upward direction and the downward direction may be, but not be limited to, upper and lower portions of FIG. 4, and may refer to a leftward or rightward direction according to a shape of the cylinder.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A flowmeter system comprising:
a high temperature transferring part that collects external heat energy to transfer the heat energy;
a low temperature transferring part that transfers heat energy of an intake pipe;
a stirling engine that produces a power based on a temperature difference between the heat energy transferred from the high temperature transferring part and the heat energy transferred from the low temperature transferring part; and
a flowmeter that is supplied with the power produced by the stirling engine to measure a flow rate of the intake pipe.

2. The flowmeter system of claim 1,
wherein the stirling engine comprises:
a high temperature acquiring part that heats an operating fluid by using the heat energy transferred from the high temperature transferring part;
a low temperature acquiring part that cools the operating fluid by using the heat energy transferred from the low temperature transferring part;
a cylinder, in which the high temperature acquiring part is positioned at a lower portion thereof, and the low temperature acquiring part is positioned at an upper portion thereof;
a displacer that moves upwardly and downwardly within the cylinder based on the heat energy of the high temperature acquiring part and the heat energy of the low temperature acquiring part;
a piston that moves upwardly and downwardly due to the upward and downward movement of the displacer; and
a generator that produces electric energy as a result of the upward and downward movement of the piston.

3. The flowmeter system of claim 1,
wherein the low temperature transferring part comprises:
an intake pipe temperature acquiring part that is positioned closed to an outer peripheral surface of the intake pipe; and
an intake pipe temperature transferring part that transfers the heat energy of the intake pipe temperature acquiring part.

4. The flowmeter system of claim 3,
wherein the intake pipe temperature acquiring part is of a shape wrapping the outer peripheral surface of the intake pipe in part or as a whole.

5. The flowmeter system of claim 1,
wherein an insulating member is positioned on a top portion of the low temperature transferring part to suppress external heat energy from being transferred to the low temperature transferring part.

* * * * *